(12) United States Patent
Sharaga

(10) Patent No.: US 8,321,351 B2
(45) Date of Patent: Nov. 27, 2012

(54) DEVICE MANAGEMENT IN A WIRELESS NETWORK

(75) Inventor: Avishay Sharaga, Bet Nehemya (IL)

(73) Assignee: Intel Corporation, Santa Clara, CA (US)

(*) Notice: Subject to any disclaimer, the term of this patent is extended or adjusted under 35 U.S.C. 154(b) by 404 days.

(21) Appl. No.: 12/631,674

(22) Filed: Dec. 4, 2009

(65) Prior Publication Data

US 2011/0138380 A1 Jun. 9, 2011

(51) Int. Cl.
G06F 9/445 (2006.01)
G06F 21/20 (2006.01)

(52) U.S. Cl. ............... 705/56; 717/178; 726/3

(58) Field of Classification Search ............ 705/56; 717/187; 726/3
See application file for complete search history.

(56) References Cited

U.S. PATENT DOCUMENTS

| 7,565,141 | B2 | 7/2009 | Macaluso | |
|---|---|---|---|---|
| 7,860,486 | B2* | 12/2010 | Frank et al. | 455/410 |
| 2004/0162058 | A1 | 8/2004 | Mottes | |
| 2006/0089125 | A1* | 4/2006 | Frank | 455/411 |
| 2006/0089126 | A1* | 4/2006 | Frank et al. | 455/411 |
| 2007/0197228 | A1 | 8/2007 | McGary et al. | |
| 2009/0073889 | A1* | 3/2009 | Radulescu | 370/252 |

FOREIGN PATENT DOCUMENTS

| WO | WO2009-040761 A2 | 4/2009 |
| WO | WO2010/083443 A1 * | 7/2010 |

OTHER PUBLICATIONS

Maes et al. (draft-maes-lemonade-p-imap-12, "Push Extensions to the IMAP Protocol (P-IMAP)", 69 pages, Mar. 2006).*
OMA Device Management Protocol Approved Version 1.2.1—Jun. 17, 2008 "Open Mobile Alliance OMA-TS-DM_Protocol-V1_2_1-20080617-A", Open Mobile Alliance, Jun. 17, 2008, 53 pages.*
IEEE Standard for Local and metropolitan area networks, Part 16: Air Interface for Broadband Wireless Access Systems, IEEE Computer Society and the IEEE Microwave Theory and Techniques Society, IEEE Std 802.16-2009, May 29, 2009, 2082 pages.*
International Search Report and Written Opinion mailed Jan. 28, 2011 for International Application No. PCT/US2010/041489.
"IEEE Standard for Local and metropolitan area networks, Part 16: Air Interface for Broadband Wireless Access Systems," IEEE Computer Society and the IEEE Microwave Theory and Techniques Society, IEEE Std 802.16 2009, May 29, 2009, New York, New York.
U.S. Appl. No. 12/511,913, filed Jul. 29, 2009.

* cited by examiner

*Primary Examiner* — James D Nigh
(74) *Attorney, Agent, or Firm* — Schwabe, Williamson & Wyatt, P.C.

(57) ABSTRACT

Embodiments of the present disclosure describe methods, apparatus, and system configurations for device management in a wireless communication network. A method includes determining, by a server of a communication network, that one or more updates are designated for a mobile station, initiating a re-authentication of the mobile station based on the determining to trigger the mobile station to establish communication with the server of the communication network to receive the one or more updates, and sending the one or more updates to the mobile station. Other embodiments may be described and/or claimed.

18 Claims, 7 Drawing Sheets

DEVICE MANAGEMENT IN A WIRELESS NETWORK

FIELD

Embodiments of the present disclosure generally relate to the field of wireless communication systems, and more particularly, to methods, apparatuses, and system configurations to manage/update a device in a wireless network.

BACKGROUND

Mobile networks that facilitate transfer of information at broadband rates continue to be developed and deployed. Such networks may be colloquially referred to herein as broadband wireless access (BWA) networks and may include networks operating in conformance with one or more protocols specified by the $3^{rd}$ Generation Partnership Project (3GPP) and its derivatives, the WiMAX Forum, or the Institute for Electrical and Electronic Engineers (IEEE) 802.16 standards (e.g., IEEE 802.16-2005 Amendment), although the embodiments discussed herein are not so limited. IEEE 802.16 compatible BWA networks are generally referred to as WiMAX networks, an acronym that stands for Worldwide Interoperability for Microwave Access, which is a certification mark for products that pass conformity and interoperability tests for the IEEE 802.16 standards.

A variety of different device types may be used in broadband wireless technologies. Such devices may include, for example, personal computers, handheld devices, and other consumer electronics such as music players, digital cameras, etc., that are configured to communicate over the wireless broadband networks. BWA networks, such as WiMAX, may use an Open Mobile Alliance Device Management (OMA-DM) protocol or another device management protocol for device activation and/or management.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
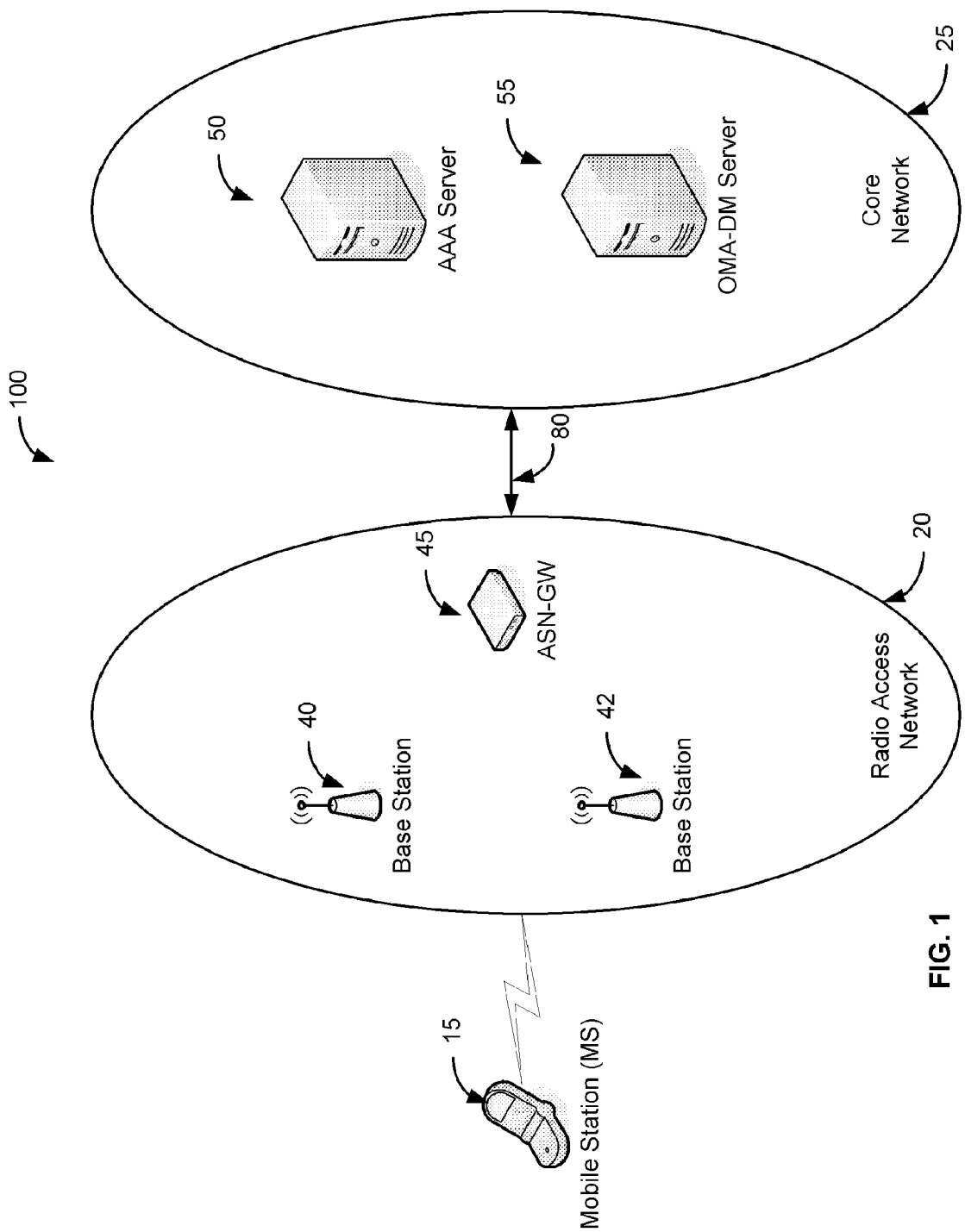
FIG. 1 schematically illustrates an example broadband wireless access (BWA) network architecture in accordance with some embodiments.

Embodiments of the present disclosure provide techniques and configurations for managing/updating a device in a wireless network. In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

While example embodiments may be described herein in relation to broadband wireless access for wireless metropolitan area networks (WMANs) such as WiMAX networks, embodiments of the present disclosure are not limited thereto and can be applied to other types of wireless networks where similar advantages may be obtained. Such networks include, but are not limited to, wireless local area networks (WLANs), wireless personal area networks (WPANs) and/or wireless wide area networks (WWANs) such as cellular networks and the like.

The following embodiments may be used in a variety of applications including transmitters and receivers of a mobile wireless radio system. Radio systems specifically included within the scope of the embodiments of the present disclosure include, but are not limited to, network interface cards (NICs), network adaptors, base stations, access points (APs), gateways, bridges, hubs and satellite radiotelephones. Further, the radio systems within the scope of embodiments of the present disclosure may include satellite systems, personal communication systems (PCS), two-way radio systems, global positioning systems (GPS), two-way pagers, personal computers (PCs) and related peripherals, personal digital assistants (PDAs), personal computing accessories and all existing and future arising systems which may be related in nature and to which the principles of the embodiments could be suitably applied.

FIG. 1 schematically illustrates an example broadband wireless access (BWA) network 100 in accordance with some embodiments. The BWA network 100 may be a network having one or more radio access networks (RANs), including RAN 20, and a core network 25.

A mobile station (MS) 15 may access the core network 25 via a radio link with a base station (BS) (e.g., BS 40, 42, etc.) in the RAN 20. The MS 15 may, for example, be a station establishing and using a working connection with the BWA network 100 using protocols compatible with the IEEE 802.16 standards (e.g., IEEE 802.16-2009, approved May 13, 2009) or WiMAX standards, such as Network Working Group (NWG) Rel 1.5 Standard or variants thereof. The base stations 40, 42 may be configured to transmit/receive messages between the MS 15 and the core network 25. While FIG. 1 generally depicts the MS 15 as a cellular phone, in various embodiments the MS 15 may be a personal computer (PC), notebook, an ultra mobile PC (UMPC), a handheld mobile device, an universal integrated circuit card (UICC), a personal digital assistant (PDA), a Customer Premise Equipment (CPE), or other consumer electronics such as MP3 players, digital cameras, and the like.

In some embodiments, communication with the MS 15 via RAN 20 may be facilitated via one or more access service network gateways (ASN-GWs), e.g., ASN-GW 45, although the embodiments are not limited to this specific type of network implementation. ASN-GW 45 (or another similar type of network node) may act as an interface between the core network 25 and RAN 20. Thus, ASN-GW 45 may be communicatively coupled to a plurality of base stations 40, 42 and may function as a type of BS controller and/or mobile switching center (MSC) to facilitate handover control and other functions for RAN 20, although the embodiments are not so limited. In a WiMAX setting, the RAN 20 may comprise an access service network (ASN) and the core network 25 may comprise a connectivity service network (CSN).

The core network 25 may include logic to activate/manage the MS 15 or other actions associated with the MS 15. For example, the core network 25 may include an authentication, authorization, and accounting (AAA) server 50 and an OMA-DM server 55. The one or more servers (e.g., 50, 55) may be communicatively coupled to the base stations 40, 42 through a communication link 80 to transmit/receive messages associated with managing/operating the MS 15 in the BWA network 100. The servers 50, 55 may be referred to as over-the-air (OTA) servers.

In some embodiments, the logic associated with the different functionalities of the depicted servers 50, 55 may be combined to reduce the number of servers, including, for example, being combined in a single machine. Although not shown, the core network 25 may further include several other components, such as a provisioning server, bootstrapping server, subscription server, and/or Home Agent (HA).

Figure 2:
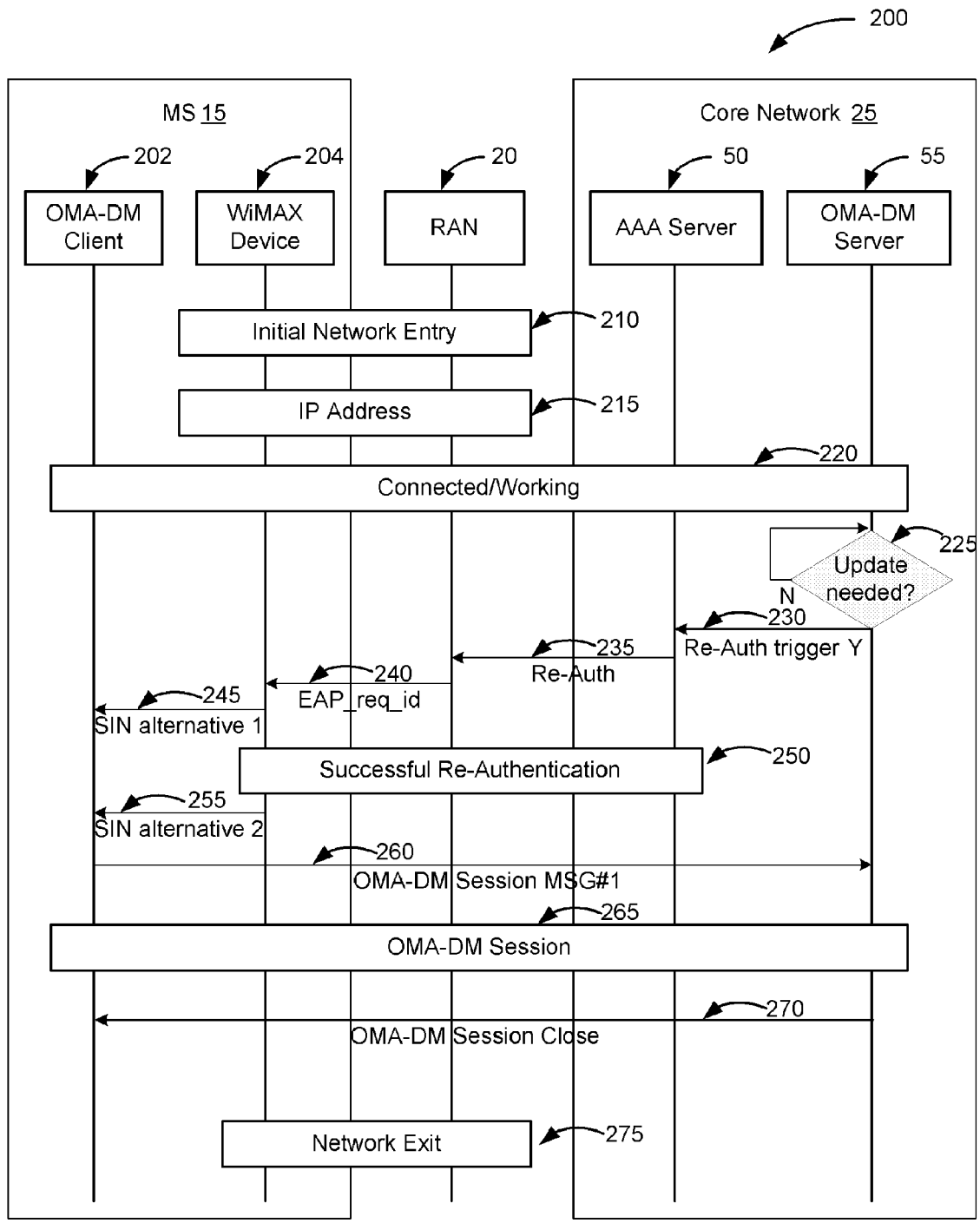
FIG. 2 schematically illustrates an example device management flow for a wireless network in accordance with some embodiments.

FIG. 2 schematically illustrates an example device management flow 200 for a wireless network (e.g., BWA network 100) in accordance with some embodiments. Referring to FIGS. 1 and 2, a transmitter (e.g., the BS 40) of the BWA network 100 may wirelessly broadcast an advertisement for a Network Service Provider (NSP). A wireless communication device (e.g., the MS 15) may enter the NSP's BWA network 100. A variety of operations may be performed to accommodate the initial network entry at 210. For example, the MS 15 may perform actions associated with network discovery and selection (ND&S), such as scanning and detecting the advertised NSP.

Other actions may be performed at initial network entry 210 including, for example, ranging, capability negotiation, authentication, authorization, and/or registration. Authentication operations may be performed by the OTA servers (e.g., AAA server 50) in wireless communication with the MS 15 via a base station (e.g., BS 40) and may be performed using, for example, Extensible Authentication Protocol (EAP). According to some embodiments, the AAA server 50 may perform authentication for networks that do not use OTA functionality such as OTA provisioning.

Upon entry of the MS 15 into the BWA network 100, the MS 15 may obtain an internet protocol (IP) address at 215 to establish a data path with the BWA network 100 and/or the OTA servers (e.g., 50, 55). The IP address may be provided, for example, by a server in a connectivity service network (CSN) of the BWA network 100 using a Dynamic Host Configuration Protocol (DHCP). Other configurations and/or protocols may be supported. After obtaining the IP address at 215, the MS 15 may be connected to the BWA network 100 at 220.

A device management server (e.g., OMA-DM server 55) of the core network 25 may determine whether one or more updates are designated for an MS 15 at 225. The one or more updates may include, for example, provisioning/configuration of the MS 15 to enable or disable features or otherwise change settings and/or parameters of the MS 15, software upgrades including new software applications and/or system software, and/or fault management to report errors or query about a status of the MS 15.

The device management server may determine that an update is designated for the MS 15 if a command is pending in a queue for the MS 15. The device management server may periodically check the queue to determine if any commands are pending. If no commands are pending, the device management server may determine that no updates are needed. If updates are designated for an MS 15, the device management server initiates a re-authentication of the mobile station at 230. The message sent at 230 may be a request to an authentication server (e.g., AAA server 50) to re-authenticate the MS 15. The message at 230 may be, for example, a notification sent using User Datagram Protocol (UDP).

The authentication server (e.g., AAA server 50) sends a re-authentication request to the MS 15. For example, at 235, a re-authentication request may be sent by the AAA server to RAN 20 for transmission, e.g., by a base station (e.g., BS 40), to the MS 15 at 240. The re-authentication request at 235 may be sent to an authenticator (e.g., ASN-GW 45) of the RAN 20 that sends the re-authentication request at 240. The re-authentication request at 240 may be transmitted, e.g., by EAP, and may be received by a wireless device (e.g., WiMAX device 204) of the MS 15. In an embodiment, the re-authentication request at 240 is an EAP identity request (EAP_req_id).

The MS 15 transmits a request 260 to open a management session (e.g., OMA-DM session 265) with the device management server (e.g., OMA-DM server 55), the request 260 being triggered by the re-authentication request received at 240. In this manner, the re-authentication trigger 230 issued by the device management server at 230 triggers the MS 15 to establish communication with the device management server to receive one or more designated updates.

The MS 15 may respond to the re-authentication request at 240 in a number of different ways to establish communication with the device management server. For example, receipt of the re-authentication request at 240 may trigger the WiMAX device 204 to send a session initiation notification (SIN) to a device management client (e.g., OMA-DM client 202) of the MS 15 to open a device management session (e.g., OMA-DM session 265) with the device management server (e.g., OMA-DM server 55). The SIN (e.g., 245, 255) may be sent and received internal to the MS 15.

According to various embodiments, receipt of the SIN (e.g., 245, 255) triggers a polling mechanism of the mobile station MS 15 to open a device management session using request 260. The polling mechanism may be internal to the OMA-DM client 202 and may have a configurable number of polling attempts and polling interval. The number of polling attempts defines how many times the polling mechanism polls to open the device management session using request 260 and the polling interval defines a time interval between the polling attempts. The polling mechanism may be, e.g., a WiMAX management object (MO) defined by the WiMAX forum. An example device capabilities (DevCap) tree stored in the MS 15 to support such a polling mechanism is described further in connection with FIG. 4.

In one embodiment, the wireless device (e.g., WiMAX device 204) sends the SIN (e.g., SIN alternative 1) at 245, prior to re-authentication at 250. The re-authentication request (e.g., 235, 240) may be protected over the air by, e.g., Cipher-based Method Authentication Code (CMAC) or other technology, allowing secure use of the re-authentication request (e.g., 235, 240) to trigger initiation at 245 of a device management session (e.g., OMA-DM session 265) prior to re-authentication. In another embodiment, the wireless device (e.g., WiMAX device 204) sends the SIN (e.g., SIN alternative 2) at 255, subsequent to re-authentication at 250. For example, another message associated with re-authentication 250 or completing re-authentication may be used to trigger the SIN 255.

In response to receipt of either SIN 245 or SIN 255, the device management client (e.g., OMA-DM client 202) of the MS 15 transmits a request 260 to open a management session (e.g., OMA-DM session 265) with the device management server (e.g., OMA-DM server 55), which session may start before or after re-authentication 250 even though the OMA-DM session 265 is depicted solely after re-authentication 250 for the sake of clarity in FIG. 2. According to various embodiments, the management session (e.g., OMA-DM session 265) may occur in parallel with re-authentication 250. The request 260 (e.g., OMA-DM session MSG#1) to open a management session (e.g., OMA-DM session 265) is received by the device management server (e.g. OMA-DM server 55). The request 260 may be a first message to initiate a device management session (e.g., OMA-DM session 265) between the MS 15 and the device management server.

In the management session (e.g., OMA-DM session 265), the device management server (e.g., OMA-DM server 55) may send one or more updates and the MS 15 may receive the one or more updates. For example, the OMA-DM server 55 may transmit the one or more updates via RAN 20 (e.g., BS 40). The OMA-DM server 55 may perform all update commands pending for the MS 15 until all updates are sent or delivered.

After the device management server (e.g., OMA-DM server 55) sends the updates during the OMA-DM session 265 (or determines that no updates are designated for the MS 15 when a re-authentication request, e.g., 235, 240, is not triggered by the device management server), the device management server closes the management session at 270. The MS 15 may continue in a connected/working state 220 as normal operation of the MS 15 is not interrupted by the management session (e.g., OMA-DM session 265) and/or a network exit 275 may be performed.

Embodiments of the present disclosure provide re-authentication triggered polling to open a management session where updates to the MS 15 can be initiated by a device management server (e.g., OMA-DM server 55) of the wireless network. In this manner, the core network 25 can control the timing of re-authentication for load-balancing of any updates for client devices (e.g., MS 15) and work around firewalls that may protect the MS 15 from otherwise receiving server-initiated updates. Implementation of re-authentication triggered updating may be facilitated in a WiMAX setting where both the OMA-DM server 55 and the AAA server 50 generally interact within the CSN. Thus, embodiments of the present disclosure allow network-initiated exchange to be internal to the CSN while remaining agnostic to the RAN 20 (e.g., ASN).

Figure 3:
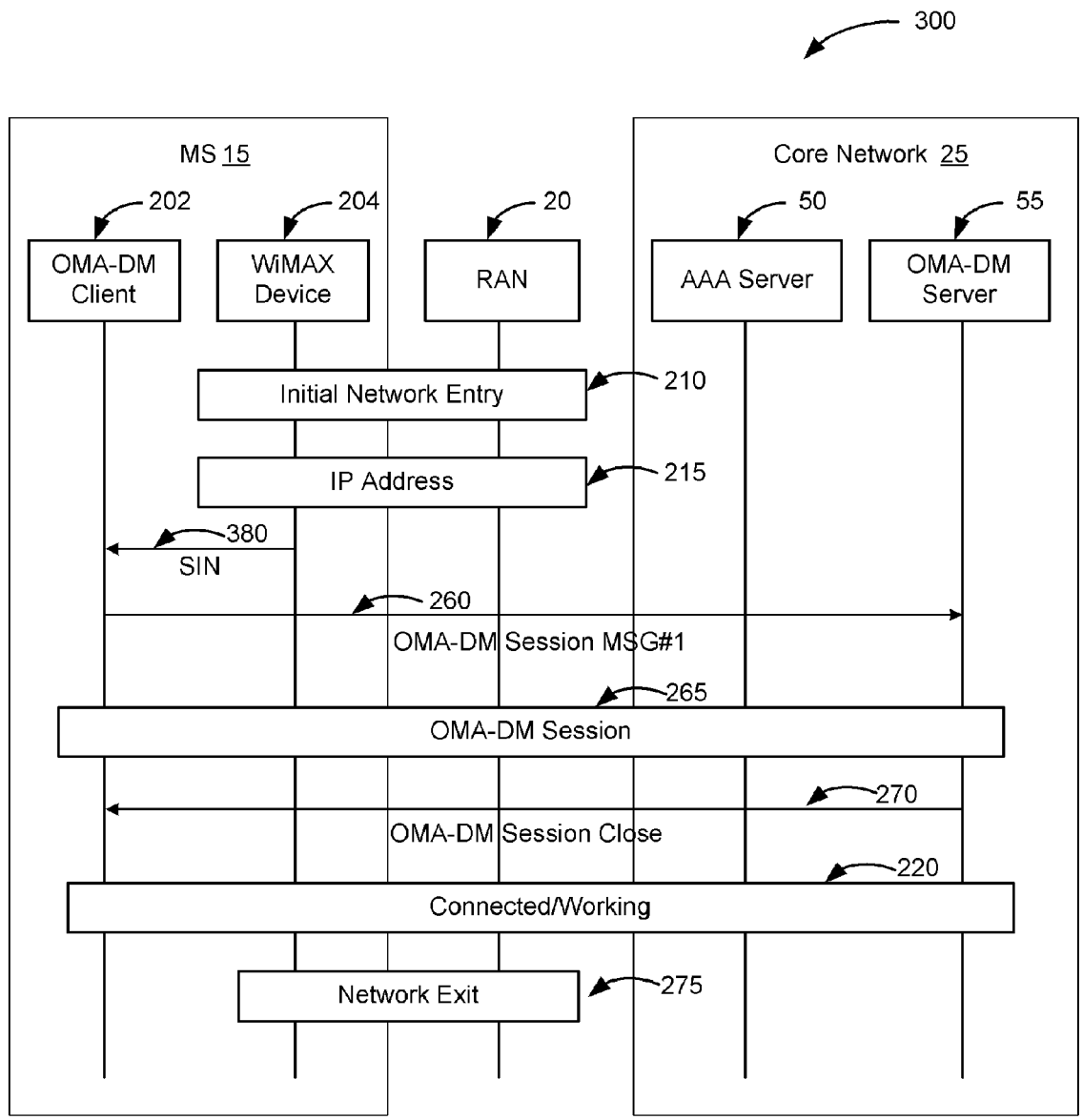
FIG. 3 schematically illustrates another example device management flow for a wireless network in accordance with some embodiments.

FIG. 3 schematically illustrates another example device management flow 300 for a wireless network (e.g., BWA network 100) in accordance with some embodiments. As described previously, a wireless communication device (e.g., MS 15) may perform operations associated with initial network entry at 210 and may receive an IP address at 215 to establish a data path with the wireless network.

In an embodiment, receipt of the IP address at 215 triggers the MS 15 to open a management session (e.g., OMA-DM session 265). For example, in response to receiving the IP address at 215, the WiMAX Device 204 of the MS 15 may send a SIN at 380 to an OMA-DM client 202 of the MS 15. In response to receiving the SIN at 380, the OMA-DM client 202 may open an OMA-DM session 265 with an OMA-DM server 55 by sending a request 260 (e.g., OMA-DM session MSG#1) to the OMA-DM server 55.

A polling mechanism of the MS 15 (e.g., internal to the OMA-DM client 202) may be triggered by receipt of the SIN at 380 to open an OMA-DM session 265 as a first polling attempt. The polling mechanism may have a configurable number of polling attempts and polling interval. A device capabilities (DevCap) tree stored in the MS 15 to support such a polling mechanism is described further in connection with FIG. 4.

Triggering of the management session (e.g., OMA-DM session 265) based on receipt of the IP address at 215 may be generally referred to as network-entry triggered polling. Network-entry triggered polling described in connection with FIG. 3 may be used in conjunction with re-authentication triggered polling described in connection with FIG. 2. According to various embodiments, the MS 15 transmits a request 260 to open a management session (e.g., OMA-DM session 265) with a device management server (e.g., OMA-DM server 55) in response to receiving an IP address 215 to establish a data path with the wireless communication network and/or in response to receiving a re-authentication request (e.g., 240 of FIG. 2). The MS 15 may continue in a connected/working state 220 and/or a network exit 275 may be performed.

Figure 4:
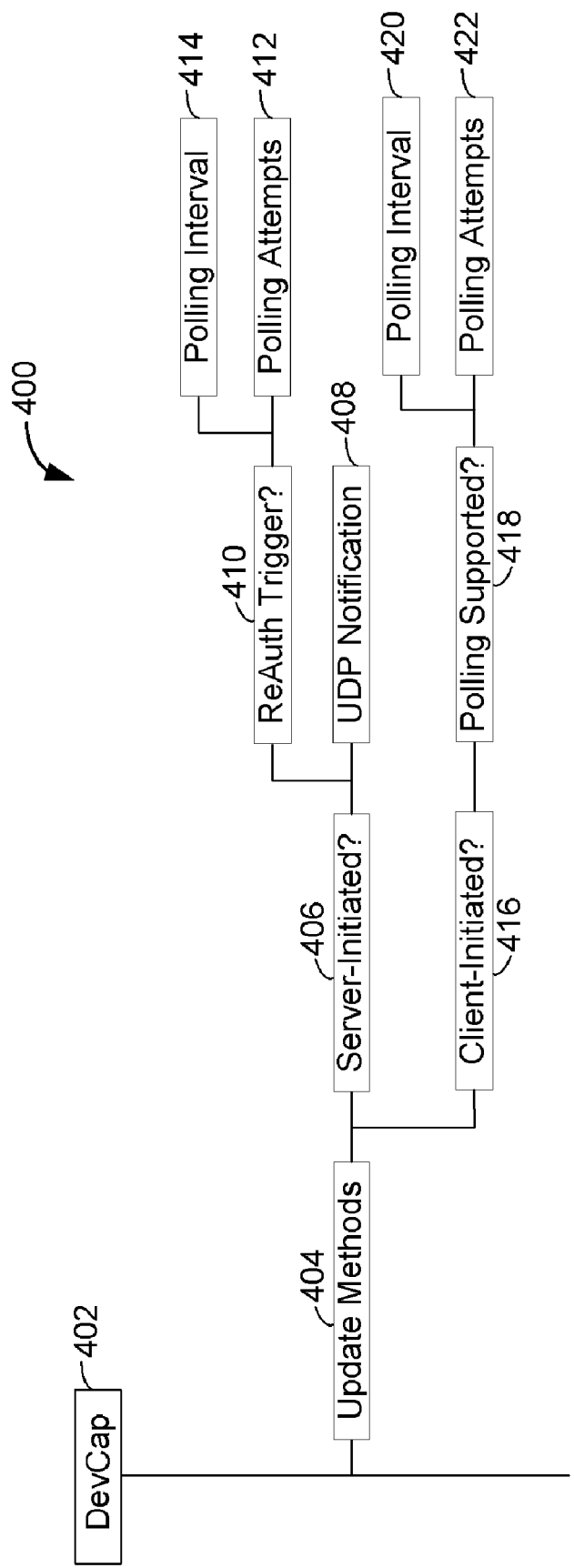
FIG. 4 schematically illustrates an example device capabilities tree in accordance with some embodiments.

FIG. 4 schematically illustrates an example device capabilities tree 400 in accordance with some embodiments. The device capabilities tree 400 may represent data or logic stored on a wireless device (e.g., MS 15) to facilitate configuration and/or provisioning of the wireless device. For example, the device capabilities tree 400 may be a management object (MO) that specifies different feature capabilities of the wireless device (e.g., WiMAX device 204) to assist a provisioning entity of the network in determining what features and parameters can and/or will be provisioned into the wireless device.

The device capabilities tree 400 includes a node 402 for device capabilities (e.g., DevCap) followed by a node 404 for update methods. There may be two types of update methods that may be used, including, for example, a server-initiated update method represented by node 406 and/or a client-initiated update method represented by node 416. The server-initiated update method may refer to re-authentication triggered polling as described in connection with FIG. 2. In a server-initiated update method, a node 408 indicating support for a notification type (e.g., UDP notification) may be presented. The notification type (e.g., UDP notification) may be a type of notification that, if received, triggers a polling mechanism to open a management session as described herein. Node 410 is used to indicate whether re-authentication triggered polling as described herein is supported/active for a mobile station. According to various embodiments, re-authentication triggered polling may be supported/active even if the notification type is not supported. If node 410 is present or supported/active, then nodes 412 and 414 may be presented to respectively define a number polling attempts and a polling interval for a polling mechanism that opens a management session as described herein. In an embodiment, the number of polling attempts 412 is set to one.

The client-initiated update method, represented by node 416, may refer to network entry triggered polling as described in connection with FIG. 3. In a client-initiated updated method, a node 418 indicating that polling is supported may be presented. If node 418 is presented, then nodes 420 and 422 may be presented to respectively define a polling interval and polling attempts for a polling mechanism that opens a management session as described herein. Nodes 420 and 422 may not exist if node 418 indicates polling is not supported. Other parameters may be included in the device capabilities tree 400 to allow configuration of retry mechanisms, designate whether the session initiation notification (e.g., SIN 245 or SIN 255) is triggered, e.g., at the beginning or end of re-authentication, designate whether the session initiation notification is triggered by MS-initiated re-authentication, and so forth. The device capabilities tree 400 may include a greater number or a lesser number of nodes than depicted.

Figure 5:
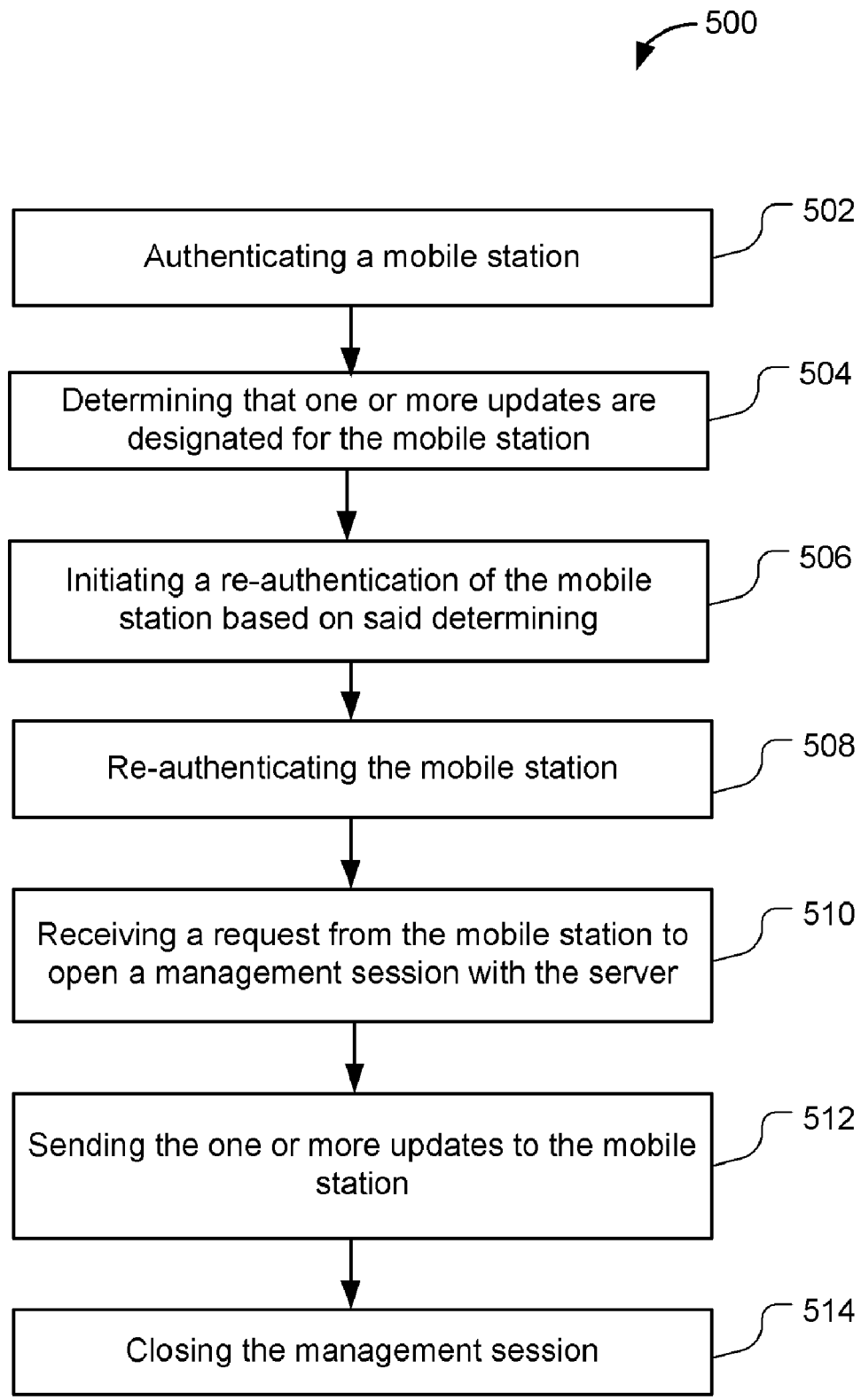
FIG. 5 is a flow diagram of a method for device management in accordance with some embodiments.

FIG. 5 is a flow diagram of a method 500 for device management in accordance with some embodiments. Communications between some of the entities may be performed over the air. At block 502, the method 500 may include authenticating a mobile station (e.g., MS 15). Authenticating may be performed, for example, by AAA server 50 or a device with similar functionality of a wireless communication network (e.g., BWA network 100).

At block 504, the method 500 further includes determining that one or more updates are designated for the mobile station. Said determining may be performed, for example, by a server of the wireless communication network. The server may be a device management server such as an OMA-DM server 55.

At block 506, the method 500 further includes initiating a re-authentication of the mobile station based on said determining at 504. For example, if the device management server (e.g., OMA-DM server 55) determines that one or more updates are designated for the mobile station, the device management server may initiate a re-authentication of the mobile station to trigger the mobile station to establish communication with the device management server to receive the one or more updates. The device management server may, for example, send a message to an authentication server (e.g., AAA server 50) to request that the authentication server re-authenticate the mobile station. Initiating a re-authentication may be performed subsequent to authenticating the mobile station at 502.

At block 508, the method 500 further includes re-authenticating the mobile station. The re-authenticating may be performed, for example, by the authentication server before, after, or simultaneously with receiving a request from the mobile station to open a management session with the server at 510 as previously described (e.g., SIN alternative 1 at 245 and SIN alternative 2 at 255).

At block 510, the method 500 further includes receiving a request from the mobile station to open a management session (e.g., OMA-DM session 265) with the server (e.g., OMA-DM server 55). The request from the mobile station may be sent in response to said initiating the re-authentication at 506.

At block 512, the method 500 further includes sending the one or more updates to the mobile station. Sending the one or more updates may be performed, for example, by the device management server (e.g., OMA-DM server 55), during a management session (e.g., OMA-DM session 265). The one or more updates may be transmitted (e.g., using RAN 20).

At block 514, the method 500 further includes closing the management session. The management session may be closed, for example, by the device management server after sending/transmitting the one or more updates to the mobile station.

Figure 6:
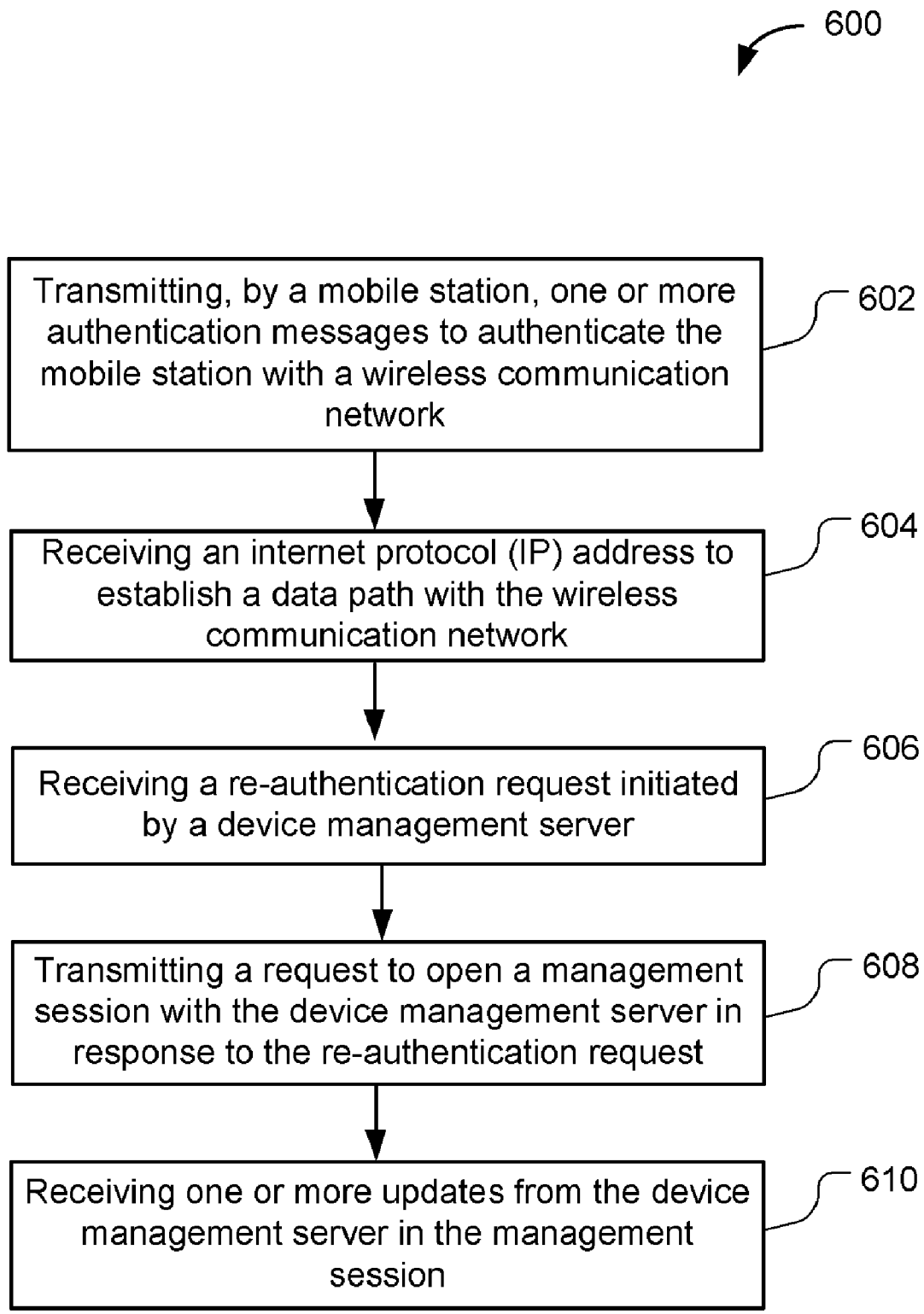
FIG. 6 is another flow diagram of a method for device management in accordance with some embodiments.

FIG. 6 is another flow diagram of a method 600 for device management in accordance with some embodiments. The operations may be performed over the air. At block 602, the method 600 includes transmitting, by a mobile station (e.g., MS 15), one or more authentication messages to authenticate the mobile station with a wireless communication network (e.g., BWA network 100). The authentication messages may be transmitted to an authentication server (e.g., AAA server 50).

At block 604, the method 600 further includes receiving an internet protocol (IP) address (e.g., 215) to establish a data path with the wireless communication network. The IP address may be received by the mobile station prior to receiving a re-authentication request at 606.

At block 606, the method 600 further includes receiving a re-authentication request initiated by a device management server. The re-authentication request initiated by the device management server may be sent by an authentication server of the wireless communication network and transmitted over the air (e.g., RAN 20). Receiving the re-authentication request may trigger the mobile station to send, by a wireless device (e.g., WiMAX device) of the mobile station, a session initiation notification (e.g., SIN 245 or SIN 255) to a device management client (e.g., OMA-DM client 202) of the mobile station to open a management session (e.g., OMA-DM session 265) with the device management server (e.g., OMA-DM server 55). The receipt of the session initiation notification (e.g., SIN 245 or SIN 255) by the OMA-DM client 202 may trigger a polling mechanism to open a management session (e.g., OMA-DM session 265) as described herein. The session initiation notification may be sent, for example, prior to or subsequent to re-authentication (e.g., 250).

At block 608, the method 600 further includes transmitting a request (e.g., request 260) to open a management session (e.g., OMA-DM session 265) with the device management server (e.g., OMA-DM server 55) in response to receiving the re-authentication request at 606. Said transmitting the request at 608 may be performed by the device management client (e.g., OMA-DM client 202) of the mobile station in response to the session initiation notification. For example, the session initiation notification (e.g., SIN 245 or SIN 255) may trigger a polling mechanism to open a management session as described herein. In another embodiment, said transmitting a request to open a management session with the device management server at 608 is further performed in response to said receiving the IP address at 604. For example, receiving a session initiation notification (e.g. SIN 380) may trigger another polling mechanism of the mobile station to open a management session as described herein.

At block 610, the method 600 further includes receiving one or more updates from the device management server (e.g., OMA-DM server 55) in the management session (OMA-DM session 265). After the updates are received by the mobile station, the device management server may close the management session.

Figure 7:
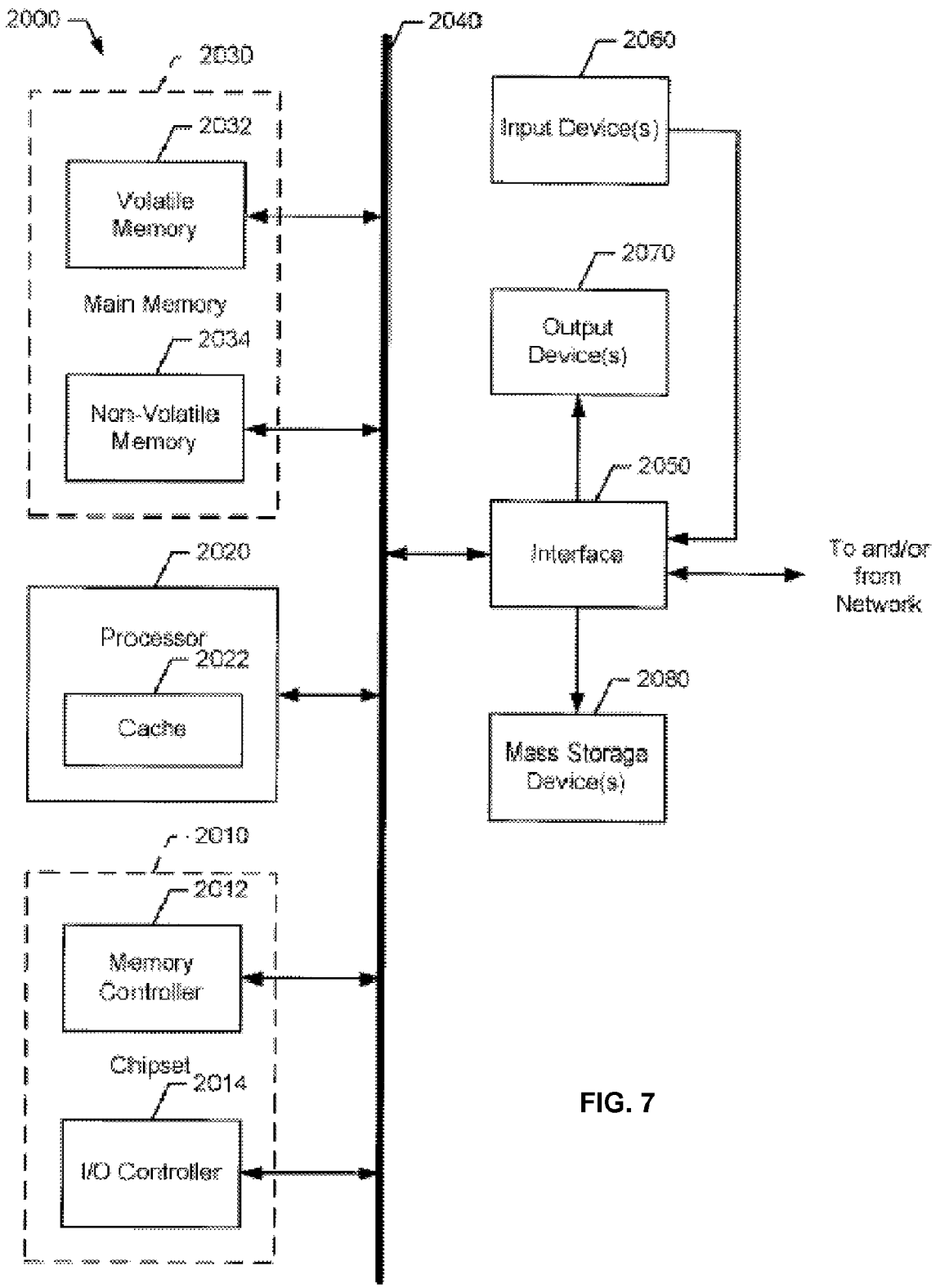
FIG. 7 schematically illustrates an example processor based system that may be used to practice various embodiments described herein.

FIG. 7 schematically illustrates an example processor-based system that may be used to practice various embodiments described herein. The processor system 2000 may be a desktop computer, a laptop computer, a handheld computer, a tablet computer, a PDA, a server, an Internet appliance, and/or any other type of computing device. In some embodiments, the processor system 2000 may be capable of functioning as the MS 15, the AAA server 50, the OMA-DM server 55, or provide logic that performs similar functions.

The processor system 2000 illustrated in FIG. 7 includes a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. The processor 2020 may be implemented using one or more processors, WLAN components, WMAN components, WWAN components, and/or other suitable processing components. The processor 2020 may include a cache 2022, which may be implemented using a first-level unified cache (L1), a second-level unified cache (L2), a third-level unified cache (L3), and/or any other suitable structures to store data. The processor 2020 may be configured to communicate with a mobile station or one or more OTA servers of a wireless network.

The memory controller 2012 may perform functions that enable the processor 2020 to access and communicate with a main memory 2030 including a volatile memory 2032 and a non-volatile memory 2034 via a bus 2040. While FIG. 7 shows a bus 2040 to communicatively couple various components to one another, other embodiments may include additional/alternative interfaces.

The volatile memory 2032 may be implemented by synchronous dynamic random access memory (SDRAM), dynamic random access memory (DRAM), RAMBUS dynamic random access memory (RDRAM), and/or any other type of random access memory device. The non-volatile memory 2034 may be implemented using flash memory, read only memory (ROM), electrically erasable programmable read only memory (EEPROM), and/or any other desired type of memory device.

An article of manufacture is disclosed herein. The article of manufacture may include a computer-readable medium having instructions stored thereon, that if executed, result in the actions described herein. The computer-readable medium may include, for example, components of main memory 2030 and/or the mass storage device(s) 2080 or any other suitable storage medium.

The processor system 2000 may also include an interface circuit 2050 that is coupled to the bus 2040. The interface circuit 2050 may be implemented using any type of interface standard such as an Ethernet interface, a universal serial bus (USB), a third generation input/output interface (3GIO) interface, and/or any other suitable type of interface.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives.

The interface circuit 2050 may also include a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

In some embodiments, the processor system 2000 may be coupled to an antenna structure (not shown in the figure) to provide access to other devices of a network. In some embodiments, the antenna structure may include one or more directional antennas, which radiate or receive primarily in one direction (e.g., for 120 degrees), cooperatively coupled to one another to provide substantially omnidirectional coverage; or one or more omnidirectional antennas, which radiate or receive equally well in all directions. In some embodiments, the antenna structure may include one or more directional and/or omnidirectional antennas, including, e.g., a dipole antenna, a monopole antenna, a patch antenna, a loop antenna, a microstrip antenna or any other type of antennas suitable for OTA transmission/reception of RF signals.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 7 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. A method comprising:
   determining, by a device management server of a communication network, that one or more updates are designated for a mobile station;
   initiating, by the device management server, a re-authentication of the mobile station based on said determining to trigger a polling mechanism of the mobile station to open a management session with the device management server to receive the one or more updates, wherein said initiating comprises requesting an authentication server of the communication network to re-authenticate the mobile station; and sending the one or more updates to the mobile station.

2. The method of claim 1, further comprising:

authenticating the mobile station prior to said initiating, by the device management server, the re-authentication of the mobile station.

3. The method of claim 1, wherein:

the device management server is an Open Mobile Alliance Device Management (OMA-DM) server; and said requesting an authentication server to re-authenticate the mobile station comprises sending, by the OMA-DM server, a User Datagram Protocol (UDP) message to the authentication server to request the authentication server to re-authenticate the mobile station.

4. The method of claim 3, wherein:

the management session is an OMA-DM session;

said sending the one or more updates is performed by the OMA-DM server during the OMA-DM session; and the method further comprises closing, by the OMA-DM server, the OMA-DM session after sending the one or more updates to the mobile station.

5. The method of claim 1, further comprising:

receiving a request from the mobile station to open the management session with the device management server.

6. The method of claim 1, wherein the communication network is a Worldwide Interoperability for Microwave Access (WiMAX) network.

7. A method comprising:

transmitting, by a mobile station, one or more authentication messages to authenticate the mobile station with an authentication server of a communication network;

receiving a re-authentication request from the authentication server, the re-authentication request being initiated by a device management server based on a determination by the device management server that one or more updates are designated for the mobile station;

transmitting, by a polling mechanism of the mobile station, a request to open a management session with the device management server, the polling mechanism being triggered to transmit the request in response to the re-authentication request; and receiving the one or more updates from the device management server in the management session.

8. The method of claim 7, wherein the device management server is an Open Mobile Alliance Device Management (OMA-DM) server, and wherein said transmitting a request to open a management session comprises transmitting a request to initiate an OMA-DM session with the OMA-DM server.

9. The method of claim 7, further comprising:

based on said receiving the re-authentication request, sending, by a Worldwide Interoperability for Microwave Access (WiMAX) device of the mobile station, a session initiation notification to an Open Mobile Alliance Device Management (OMA-DM) client of the mobile station to trigger the polling mechanism to perform said transmitting a request to open a management session with the device management server.

10. The method of claim 9, wherein said sending the session initiation notification is performed prior to completion of re-authentication of the mobile station.

11. The method of claim 9, wherein said transmitting a request to open a management session is performed by a polling mechanism having a configurable number of polling attempts set to one.

12. The method of claim 7, further comprising:

receiving, by the mobile station, an internet protocol (IP) address to establish a data path with the communication network prior to said receiving a re-authentication request;

wherein said transmitting a request to open a management session with the device management server is further performed in response to said receiving the IP address.

13. The method of claim 7, wherein the communication network is a Worldwide Interoperability for Microwave Access (WiMAX) network.

14. A system comprising:

an authentication module configured to authenticate a mobile station; and a device management module configured to determine that one or more updates are designated for the mobile station;

initiate a re-authentication of the mobile station based on the determination to trigger a polling mechanism of the mobile station to open a management session with a server of a communication network to receive the one or more updates, wherein the device management module is configured to initiate the re-authentication by requesting the authentication module to re-authenticate the mobile station; and transmit the one or more updates to the mobile station.

15. The system of claim 14, wherein the device management module is configured to initiate the re-authentication of the mobile station by:

sending, by an Open Mobile Alliance Device Management (OMA-DM) server, a message to an authentication server to re-authenticate the mobile station.

16. The system of claim 15, wherein the device management module is configured to transmit the one or more updates by the OMA-DM server during an OMA-DM session.

17. The system of claim 14, wherein the device management module is further configured to receive a request from the mobile station to open the management session with the server, the request being in response to initation of the re-authentication of the mobile station.

18. The system of claim 14, wherein the communication network is a Worldwide Interoperability for Microwave Access (WiMAX) network.

* * * * *